UNITED STATES PATENT OFFICE.

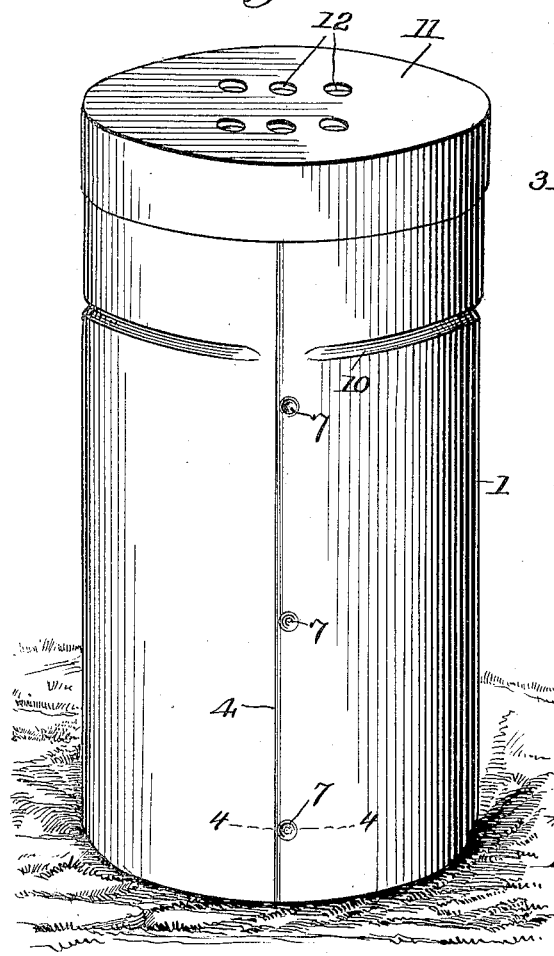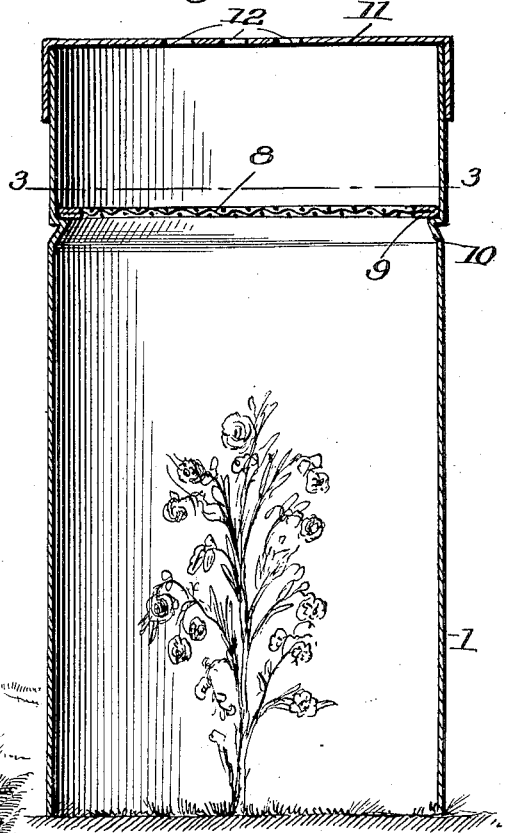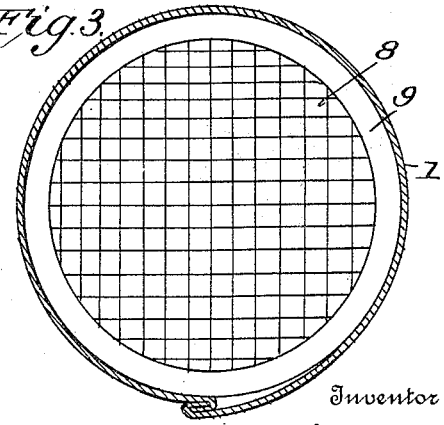

CHARLES A. BIGELOW, OF LAKEWOOD, NEW MEXICO.

PLANT-PROTECTOR.

1,074,828.

Specification of Letters Patent. Patented Oct. 7, 1913.

Application filed August 29, 1912. Serial No. 717,805.

*To all whom it may concern:*

Be it known that I, CHARLES A. BIGELOW, a citizen of the United States, residing at Lakewood, in the county of Eddy and State of New Mexico, have invented certain new and useful Improvements in Plant-Protectors, of which the following is a specification.

This invention relates to plant protectors, and has as its object to provide a highly efficient durable, and inexpensive device of this class, and one which will protect a plant from insects, frost, hail, wind, heavy rains, etc., but which will at the same time not interfere with proper ventilation of the plants.

Another object of the invention is to provide a plant protector which is simple in construction, inexpensive to manufacture, may be readily folded to occupy but little space, and may be quickly set up.

The invention also aims to provide a plant protector so constructed that the amount of air admitted to the plants, as well as the amount of light, may be regulated.

A further aim of the invention is to provide a plant protector which, while it may be readily set up or collapsed, will embody no loose securing elements which are liable to be lost.

For a full understanding of the invention reference is to be had to the following description and accompanying drawing, in which:—

Figure 1 is a perspective view of the device embodying the present invention. Fig. 2 is a vertical sectional view therethrough. Fig. 3 is a horizontal sectional view on the line 3—3 of Fig. 2. Fig. 4 is a detail horizontal section on the line 4—4 of Fig. 1.

Corresponding and like parts are referred to in the following description and indicated in all the views of the drawing by the same reference characters.

The protector embodying the present invention includes a substantially cylindrical body which is formed from sheet metal, or other suitable material, and which when collapsed, will be of sheet form. This body is indicated in general by the reference numeral 1, and one vertical edge of the sheet of which it is formed is folded upon itself as at 2 so as to provide a flange 3 which is spaced from the said body 1. The body at its other vertical edge is similarly folded as at 4 to form a flange 5 and when the body is to be set up, it is bent to substantially cylindrical form and the flange 5 is fitted behind the flange 3, and vice versa.

In order to hold the flanges 3 and 5 against separation and thereby hold the body in set up condition, the flanges 3 and 5 and the portions of the body opposite which they are located are formed at intervals with indentations 6 and 7 respectively, the indentations 6 receiving the projections or ribs resulting from the formation of the indentations 7.

The body above described is open at its upper and lower ends as will be apparent from inspection of Fig. 3 of the drawing, and it is designed to have its lower end portion inserted into the soil surrounding the plant to be protected.

As a means for protecting the plants against hail and heavy rains, and also against insects which might otherwise enter into the protector, a wire screen 8 is arranged within the body of the protector near the upper end thereof and at its periphery is reinforced by means of a rim 9. This rim rests upon a shoulder 10 which is formed by striking in the wall of the body of the device in the manner illustrated in Fig. 2 of the drawings, the struck-in portion of the wall being of such cross-sectional form that the supporting face of the shoulder will be presented directly upwardly. In addition to the screen above mentioned, it is proposed to employ a cover or cap 11 which is removably fitted upon the upper end of the body 1, and which is formed with one or more perforations 12 which are preferably located about the axis of the cover.

From the foregoing description of the invention it will be readily understood that the device may be readily set up or collapsed and that when set up the screen may be readily removed from within the device after the cover 11 has been removed and that the cover may be employed without making use of the screen 8, or the screen 8 may be used without the cover.

In using the device the same is disposed about the plant to be protected with the wire screen in place, the cover being removed during the day so as to receive the full benefit of the sunlight and air although it is protected by the screen against hail, heavy rains and insects. The screen also serves to protect the plants from the fall of water when they are sprinkled. At night, the cover is placed upon the upper end of the body and while the openings therein permit the entrance of sufficient air to properly ventilate the plants, nevertheless this cover effectually protects the plants against heavy frosts.

Of course it will be understood that the wire screen 8 may be of any desired mesh and that two or more of the openings 12 may be provided in the cover 11, and that these may be of any desired diameter.

Having thus described the invention what is claimed as new is:—

1. In a device of the class described, a hollow body open at its lower end, a screen supported within the body near the upper end thereof, and a perforated cover removably fitted upon the upper end of the body.

2. In a device of the class described, a hollow body, formed from a single sheet of material provided at opposite edges with flanges arranged to be interlocked, the said flanges being indented to form studs and sockets arranged to coöperate with each other to hold the flanges interlocked, and a foraminous closure for the upper end of the body.

3. In a device of the class described, a hollow body formed from a single sheet of material having interlocking separable edges, the sheet being provided with a transversely extending bead, and a foraminous sheet removably disposed within the body and supported by the bead.

In testimony whereof I affix my signature in presence of two witnesses.

CHARLES A. BIGELOW. [L. S.]

Witnesses:
B. F. BEARMAN,
E. L. HUMPHREYS.

Copies of this patent may be obtained for five cents each, by addressing the "Commissioner of Patents, Washington, D. C."